UNITED STATES PATENT OFFICE.

EDGAR H. BENEDICT, OF PHILADELPHIA, PENNSYLVANIA, ASSIGNOR OF ONE-HALF TO FRANCIS G. BATES, OF SAME PLACE.

PLASTERING COMPOUND.

SPECIFICATION forming part of Letters Patent No. 460,520, dated September 29, 1891.

Application filed May 8, 1890. Serial No. 351,090. (No specimens.)

*To all whom it may concern:*

Be it known that I, EDGAR H. BENEDICT, a citizen of the United States, and a resident of Philadelphia, Pennsylvania, have invented an Improved Plastering Compound, of which the following is a specification.

The object of my invention is to provide a plastering compound which will be fire-proof and water-proof, will form a firm and durable coating upon walls, ceilings, or other surfaces, and can be more readily mixed and applied than ordinary plastering-mortar. This object I attain in the manner hereinafter set forth.

My improved compound comprises about twenty-five (25) per cent. of lime, from fifteen (15) to twenty (20) per cent. of clay, from seven (7) to twelve (12) per cent. of asbestus fiber, and from fifty (50) to seventy-five (75) per cent. of sand or equivalent matter, such as ground stone, pulverized flint, or the like.

In preparing the compound the proportions of the respective ingredients employed will depend upon circumstances. Thus the quantity of sand used will depend upon the quality of the sand and upon the use for which the plastering compound is desired, a plaster intended to be used as a finishing-coat having a higher percentage of sand than when it is intended for a ground or rough coat, while the water-repellent qualities of the plaster may be increased by increasing the percentage of clay and the heat-resisting qualities augmented by an increased proportion of asbestus fiber.

The compound is mixed with water to the desired consistency, and the lime is preferably used in pulverized form, so that the compound can be sold and transported in the form of a powder, which can be readily mixed in small quantities indoors, being thus especially adapted for use in winter work, although it should be understood that in carrying out my invention the use of pulverized lime is not absolutely essential, as the usual lump-lime may be first slaked, and the other ingredients of the compound then added thereto.

The compound is applicable as well to the ordinary wooden lathing, to wire lathing, to rough boards, or to brick or stone walls, and when applied to wooden lathing the laths may be placed very closely together, as the compound on drying sets so firmly and is so homogeneous in its character that very little keying of the plaster is required. I find, moreover, that a much lighter coating of my improved compound is required than of ordinary plastering-mortar, the weight of the improved compound being but one-half that of such ordinary mortar.

The presence of the clay in the compound retards the drying of the same in hot weather, and thus prevents that disintegration which is one of the results of the rapid drying of ordinary plastering-mortar.

Besides rendering the compound capable of resisting fire or heat, the asbestus fiber is much preferable to the hair ordinarily employed as a binding ingredient in mortar, for said asbestus fiber does not stain or discolor the compound as hair is likely to do, and it is free from lumps and skin, so that waste is prevented and a much smoother coating is possible than when hair is used.

The clay is used in powdered form and combines with the lime and sand to render the compound extremely dense and homogeneous, and thus impervious to moisture, the clay also increasing the hardness of the compound and its consequent durability, besides lessening the amount of lime which would otherwise be required.

Having thus described my invention, I claim and desire to secure by Letters Patent—

The within-described plastering compound, consisting of lime, clay, asbestus fiber, and sand, substantially as specified.

In testimony whereof I have signed my name to this specification in the presence of two subscribing witnesses.

EDGAR H. BENEDICT.

Witnesses:
 EUGENE ELTERICH,
 HARRY SMITH.